Dec. 30, 1969     B. N. FLEMING     3,487,433

SELF-FISH FEEDER

Filed March 15, 1968

INVENTOR

Bruce N. Fleming

BY Scofield, Kokjer, Scofield + Lowe

ATTORNEYS

United States Patent Office 3,487,433
Patented Dec. 30, 1969

3,487,433
SELF FISH FEEDER
Bruce N. Fleming, 430 Beech St.,
Ottawa, Kans. 66067
Filed Mar. 15, 1968, Ser. No. 713,413
Int. Cl. A01k *61/02*
U.S. Cl. 119—51                                12 Claims

ABSTRACT OF THE DISCLOSURE

A self fish feeder is mounted over a fish containing body of water and has a particulate feed containing hopper. A combined feed trough and grid structure are suspended on a rod from a conveyor means which is mounted interiorly of the hopper. As the fish contact the feed trough during normal feeding, a resulting movement of same occurs. This movement, caused by the fish "rooting" around a trough-grid combination, is translated through the rod structure to the conveyor means. The conveyor means and related structure then operates to both break up the particular fish feed around a discharge opening in the hopper and to help move the feed through the opening onto the trough-grid combination, thereby recharging the trough with feed.

BACKGROUND AND BRIEF DESCRIPTION
OF THE INVENTION

The above-mentioned self fish feeder is designed to stimulate a maximum growth in fish such as channel catfish in the shortest possible period of time. As a general rule, fish growers deposit the fish feed by hand in a particular feeding area. This type of feeding has the inherent disadvantage of allowing the larger and more aggressive fish to ingest their fill leaving only the remains of the amount deposited for the other fish. As a result, the particular needs and the capacity of the fish had to be estimated and hopefully the correct amount dispensed for optimizing the growth rate of all the fish. My invention makes it possible for the fish to essentially feed themselves, thusly saving on feed by eliminating the usual propensity to over feed and substantially reducing the manual labor heretofore involved in the feeding operations.

The subject self fish feeder includes a hopper which is mounted over the feeding area but which is easily accessible from the shore for refilling purposes. The hopper has a shaped interior so that the particulate fish feed (generally pelleted) will be directed toward a centrally located opening in the bottom of the hopper. A feed trough and feed dispersing grid arrangement depend from the hopper below the water surface on a combination rod and conveyor means structure which is mounted interiorly of the hopper through the centrally located opening. Conveyor means is constructed to include at the upper end thereof a "feeler rod" and a cross bar. The bar facilitates the "bridging" over of feed in proximity to the opening and the feeler rod operates to break up the "bridged over" feed so that same may fall down through the opening.

The latter function is facilitated by the normal feeding habits of many different types of fish, and more particularly channel catfish. For example, the feed trough is so constructed that all of the fish feed located thereon may not be consumed by the fish. A portion of the feed is protected by a spiraling construction and allowed to remain on the trough. When the fish become sufficiently hungry they will attempt to consume the feed behind the spiral structure, thereby coming in contact with the feed trough and causing it to move back and forth. This movement is translated through the rod structure to the conveyor means and thence to the feeler rod which also moves to break up the semi-packed feed around the opening. As the feed is broken up the particles of same are dispensed through the opening and back onto the feed trough. The feeding cycle naturally repeats itself and with the fish "rooting" around the trough, more feed is dispensed through the opening, thereby constantly recharging the feed trough.

An object of the invention is to provide a uniquely constructed labor saving self fish feeder that operates to permit the fish themselves to control the dispensing of their own feed.

Another object of the invention is to provide a uniquely constructed self fish feeder which recharges a feeding trough below the water surface with fish feed as a result of the normal feeding habits of fish.

Another object of the invention is to provide a fish feeder of the character described which stores the fish feed above the water surface and suspends a feeding trough, supplied with feed from above, below the water surface. The invention is thereby constructed to eliminate waste of the fish feed and to stimulate maximum growth in the shortest period of time since the normal feeding activity on the part of the fish recharges the trough with fish feed.

A still further object of the invention is to provide a fish feeder of the character described which protects a portion of feed on the feed trough from being ingested by the fish. By utilizing a unique trough and protector spiral, all the feed on the trough is never completely consumed and that which remains attracts fish back to the feeder when they require more food and thereby through their own actions recharge the trough with more feed.

A further object of the invention is to provide a self feeder of the character described which includes a means for stabilizing the feeder so that only normal feeding activity of the fish, and not abnormal winds and weather, will dispense the fish feed onto the feed trough.

Another object of my invention is to provide a unique method for feeding fish which comprises the steps of locating a hopper containing feed above a feeding area, flexibly suspending a feed trough from said hopper, dispensing feed from said hopper onto said trough as a result of the fish contacting and moving said trough, stablizing the position of said trough and said flexible suspending means after movement thereof, and attracting said fish to contact and move said trough when said fish demand feed, said contacting moving of said thereby causing said feed to be dispensed from said hopper.

Other and further objects of the invention, together with the features of novelty appurtenant thereto, will appear in the course of the following description.

DETAILED DESCRIPTION

In the accompanying drawing, which for a part of the specification and are to be read in conjunction therewith, and in which like reference numerals indicate like parts in the various views.

Figure 1:
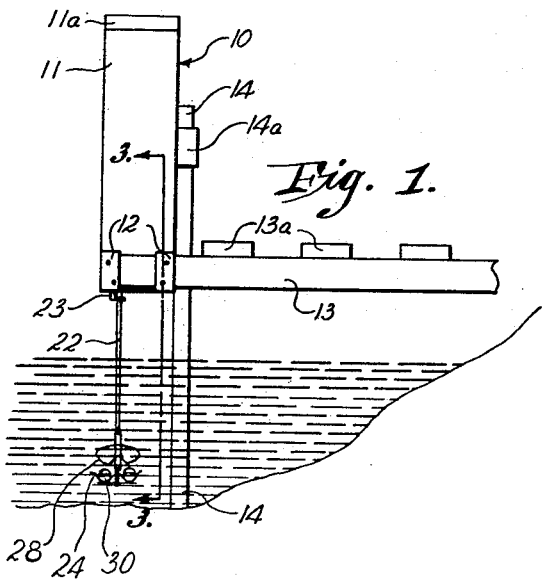
FIG. 1 is a side elevational view of the subject self fish feeder shown in its normal rest position.
Figure 2:
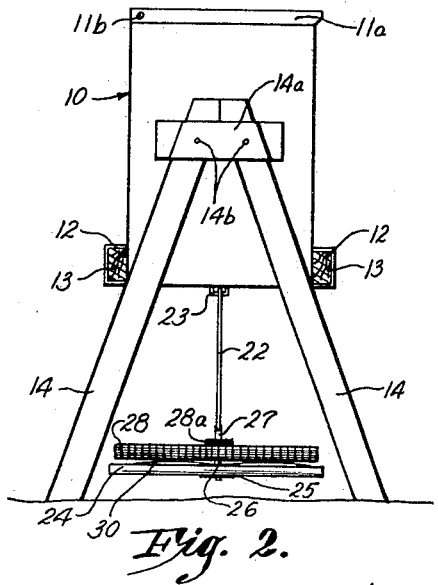
FIG 2 is a rear elevational view of the fish feeder seen in FIG. 1, with the rails shown in section.

Referring now more particularly to the drawing, the subject fish feeder is generally designated by the numeral 10 in FIGS. 1 and 2. A principal portion of the fish feeder is a hopper 11 which is a galvanized steel box-like structure that is designed to be rigidly supported over a body of water at a selected distance from the bank or shore. A pair of rectangularly shaped rail holding brackets 12 are located on each side of hopper 11 at the lower portion thereof. These brackets are sized to engage and hold rails 13 which extend from the bank or shore. Legs 14 are positioned within a shaped leg bracket 14a so that the legs form an inverted V from a position above the leg bracket (see FIG. 2) to and below the water surface. The legs extend from the vertex of the V tightly against the rails and are then embedded in the land surface under the water. Conventional bolts or nails 14b extend through the bracket 14a and into the legs themselves, thereby insuring that the legs are maintained in the inverted V rail contacting position. Conventional planks 13a may span the two rails 13 to form steps thereon, thusly facilitating easy access to the fish feeder for the servicing thereof.

Turning now more particularly to the construction of the fish feeder itself, hopper 11 is principally comprised of a rectangular galvanized steel box with the upper end portion open. A top or lid 11a is pivotally connected at one end portion thereof to the upper left hand corner of hopper 11 (see FIG. 2). This pivotal connection (11b) may be in the form of a loose rivet connection or a suitable bolt and lock nut arrangement, thereby effectively hinging top 11a to the hopper 11. The sides of top 11a are flanged downwardly and slidably contact the adjacent sides of hopper 11. There is a slight overlap of the hopper and the top at the right hand portion (again note FIG. 2), thereby providing a suitable hand hold for raising and lowering the same relative to the open end of the hopper.

Figure 3:
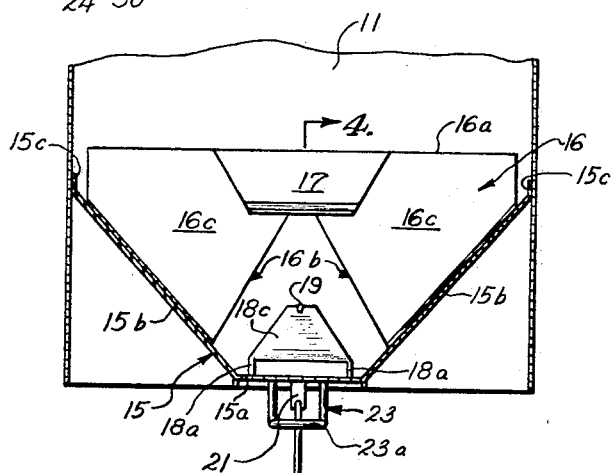
FIG. 3 is an enlarged fragmentary sectional view taken generally along the line 3—3 of FIG 1 in the direction of the arrows, showing substantially the lower portion of the feed hopper, the feed dispensing supporting structure, auger, interconnecting rod and the feed trough construction.

The lower end portion of hopper 11 is also open, however an inner tapered bottom, generally indicated by the numeral 15, is riveted to the lower narrower sides of the hopper to provide a funnel-like structure. The inner bottom is essentially formed of a single piece of galvanized steel with a central portion 15a being located in the horizontal plane near the end extremity of the open hopper end. The two adjacent sides, 15b, are bent upwardly from the central portion and each has a vertically turned end portion 15c which rests flush against the inner sides of the hopper (see FIG. 3). The flush end portions 15c are then riveted through the exterior of the hopper, thereby securely positioning the inner bottom 15. It should be noted that the central portion 15a and the two tapered sides 15b are of a selected dimension so that they completely span the inside of the hopper and when riveted thereto would tend to divert any flow of fluent or granulated material toward the center of central portion 15a as will be discussed in more detail later.

Figure 4:
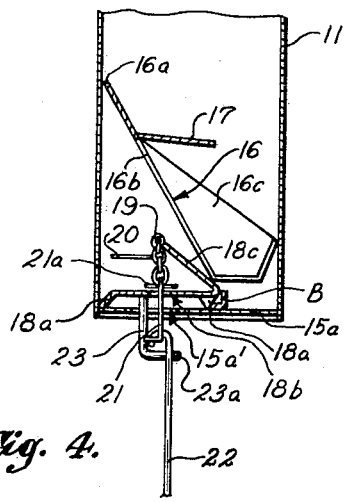
FIG. 4 is a view taken generally along the line 4—4 of FIG. 3 in the direction of the arrows.
Figure 5:
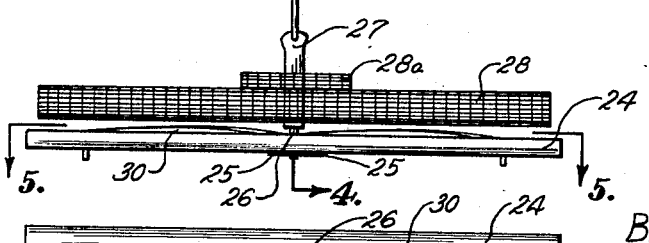
FIG. 5 is a top plan view of the feed trough taken generally along the line 5—5 of FIG. 3 in the direction of the arrows.

A baffle construction generally indicated by the numeral 16 is placed on the upper surfaces of sides 15b and in contact with box 11 along edge 16a. The baffle generally slopes downwardly and to the right (as seen in FIG. 4) having a central V shaped cut out portion so arranged that there is direct communication through the cut out with the central portion of the inner bottom 15a. This cut out portion is identified by the edges 16b of the baffle 16 and thusly and essentially divides the baffle into two diverging plates 16c on either side thereof. For further support, these two plates 16c have the end portion thereof angled upward to fit flush against the upper surface of sides 15b. This arrangement adds rigidity to the baffle structure in that the flush fitting sides form a base for the baffle.

Located directly above cut out 16b is a horizontal deflector plate 17. Plate 17 has an upper angled portion which is weldedly connected to the upper portion of baffle 16. The main portion of plate 17 lies in a horizontal plane which, as seen in FIG. 4, extends from the apex of the cut out portion to the right of the cut out.

As suggested above, central portion 15a of inner bottom 15 is apertured at 15a'. This aperture is directly in line with the cut out opening 16b of baffle 16 and is covered, in a spaced relationship, by deflector plate 17.

A second apertured plate 18, which is triangular in shape when viewed from above, has its corner end portions 18a bent downwardly for the purpose of contacting the apertured central portion 15a of the inner bottom 15. In this manner, these tips of the triangular plate (18a) support the plate in spaced relationship with respect to the central portion 15a of inner bottom 15. Also, an angle bracket B (see FIG. 4) is welded to central portion 15a and helps locate plate 18 in a fixed position. Aperture 18b is aligned in communicating relationship with aperture 15a' and cut out 16b in this fixed location. The right hand portion 18c of plate 18 is bent back over itself at approximately a 45° angle. Since the plate is constructed of a very tough and strong galvanized steel, a considerable weight may be supported from the upper end of angle plate 18c.

The upper end extension of the angle plate 18c is suitably slotted to permit the attachment of chain 19 thereon. This chain depends from the upper end directly above the center of aligned apertures 18b and 15a'. A feeler rod 20 is weldedly attached to the central portion of the chain and extends in a substantially horizontal plane therefrom.

A conveyor means 21, in the form of a J-shaped rod supporting structure, is connected through a suitable slot to the lower end portion of chain 19 and extends through the central area of the two apertures 18c and 15a', respectively. A cross bar, 21a, is welded to the upper end portion of conveyor means 21 directly below the connection with chain 19. This rod also lies in a substantially horizontal plane, but extends past conveyor means 21 on each side thereof. The lower portion of conveyor means 21 is suitably apertured for the reception of the looped upper end of rod 22. In this manner, conveyor means 21 is an intermediate element between chain 19 and rod 22 and which occupies the space between the two registering apertures 18b and 15a'.

Rod 22 is held in a stable position by a heavy gauge wire stabilizer 23 which is weldedly connected with the lower surface of aperture plate 18. The lower end of stabilizer 23 includes a looped portion 23a which is "pinched" together to form an oval loop of a slightly larger diameter than rod 22. This oval loop provides a bearing contacting surface for rod 22 and prevents inadvertent movement due to wind, etc. It should be pointed out that the upper end of rod 22 is looped through a suitable aperture in the lower portion of auger 21. The lower J shape of the conveyor means and the looped end of the rod cooperatae to tilt the rod the rod 22 into the looped portion 23a of stabilizer 23.

As mentioned above, the hopper 11 is supported above the water surface by the combination of legs 14 and rails 13. Rod 22 is of a selected length so that its lower end extends approximately 15 to 20 inches below the water surface. A feed trough generally indicated by the numeral 24 and, as will be seen later, lies in a substantially horizontal plane another 4 to 5 inches below the end extremity of rod 22. The feed trough (24) may be conveniently manufactured of corrugated glass fiber. A brass plate 25 is riveted to the underside of trough 24 along the transverse center line of the plate. The plate is sufficiently long so that the rivets may be placed through the "valleys" of the corrugated trough.

A center mounted rod 26 is rigidly affixed to plate 25 and extends upwardly therefrom through the trough (see FIG. 4). Cylindrical tube 27, with one end open and the upper end pressed together and turned horizontally, has its open end telescoped over rod 26. The telescoping combination tube and the rod are then pin connected by a conventional compressible pin which extends through aligned openings (not shown) in both the tube and the rod. The openings in the tube are sufficiently sized to permit relative movement between the tube 27 and rod 26, e.g. tube 27 may rotate approximately 15° to the either side of longitudinal center line of feeder trough 24.

A screen wire grid 28 is fixedly connected (welded) to tube 27 and is movable therewith. The grid, when viewed from the side as in FIG. 4, approximates the shape of a W and has an arched central span 28a of a considerably shorter length than the entire grid and which is likewise joined to tube 27 above the lower grid connection for additional support. Located immediately below the grid 28 and in each "valley" of the corrugated trough 24 is a spiral 30. These spirals are generally constructed of aluminum or any other suitable rust-free metal and are connected at each end portion thereof in its respective valley in the trough 24. The entire feed trough-grid combination is thusly suspended from rod 22 and the feed hopper by interconnecting the lower looped end of rod 22 and a suitable aperture in the horizontally turned upper end of the cylindrical tube 27.

In operation, the fish feeder 10 is fixedly located as described above and shown in FIG. 1. The hopper 11 is supported above the water level and the feed tray which depends therefrom extends approximately 15 to 20 inches below the surface of the water. The hopper is filled with fish feed which is generally either pelletized or granulated feed of a relatively fluent consistency. The feed particles diverge toward the lower central portion of the hopper due to the shape and positioning of the baffle and lower inner bottom. Deflector plate 17 helps to hold the weight of the feed up from the lower portion of the hopper. However, the over-all construction of the hopper interior allows and directs a considerable portion of the pelletized or granulated feed down in and around the apertured plate 18. The presence of cross bar 21a which is welded to the upper portion of conveyor means 21 and which is located immediately above aperture 18b, creates a "bridging over" effect of the feed immediately above aperture 18. Accordingly, with the feeder at rest, no fish feed will fall through the aligned apertures (18b and 15a') on through the water and into the trough because the combined chain and cross bar effectively "plug" the upper aperture 18b.

As suggested above, the feed trough is swingably supported from the upper end portion of the angle platae 18c via a combination of elements including chain 19, conveyor means 21 and rod 22. This arrangement allows for a limited rotary motion plus a swinging side to side movement induced by the fish's rooting action from a pivot position interiorly of the hopper. The rotational movement between trough 24 and grid 28 is made possible by the telescoping loosely pinned connection between tube 27 and pin 26, and this movement also dispenses feed.

The construction of the feed trough, including the spirals, is such that fish feed tends to locate on the trough in and around the spirals in positions where it is impossible for the fish to reach same. As a result, when hungry, the fish tend to root around the trough in an attempt to reach the hard to get at feed particles. This rooting tends to divert the depending structure from its plumb position and to transmit the resulting swinging motion upwardly through the rod 22, conveyor structure 21, to chain 19. Accordingly, feeler rod 20 moves in a manner to "break up" the "bridged over" fish feed particles above aperture 18b. Also, the flattened upper portion of supporting structure (conveyor means) 21 in cooperation with cross bar 21a tend to act as an agitator or auger, thusly assisting in transmitting the granulated or pelletized fish feed through the two communicating apertures 18b and 15a'.

With the feed falling out of the hopper 11 and onto the water surface, it eventually falls upon grid 28 and settles down on feed trough 24. When the fish have eaten their fill, the trough returns to its quiescent point and the "plugging" or "bridging over" effect once again takes place above aperture 18b. As the fish again become hungry, they will return to the feed trough where the above described rooting will cause the trough to swing to and fro or to rotate, thereby once again causing the trough to be recharged with the fish feed.

This construction calls for very little human attention in that it requires only the refilling of the hopper at predicted intervals. The fish in the feeding area provide all the motion that is necessary to activate the self feeder and as a result the weight control and size of the fish prior to harvesting may be optimized with little attendant personnel.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:
1. An apparatus for dispensing feed in a fish containing body of water, said apparatus comprising
 a hopper, said hopper being substantially enclosed and operable to hold particulate fish feed therein;
 an opening defined in the lower portion of said hopper,
 means for selectively retaining said feed within said hopper opening, thereby selectively precluding the dispensing of same through said opening,
 a feed trough, said trough located below the water surface,
 means interconnecting said trough with said hopper through said opening,
 means for stabilizing the position of said trough and said interconnecting means,
 means for dispensing said feed through said opening onto said trough as a result of the fish contacting and moving said trough, and
 means for attracting said fish to contact and move said trough when said fish demand feed thereby dispensing said feed onto said trough.

2. The invention as in claim 1 wherein said dispensing means includes a conveyor suspended from one end thereof above said opening, said conveyor operable to transport said fish feed through said opening as a result of said trough being moved.

3. The invention as in claim 2 wherein said retaining means causes said feed to bridge over said opening, and wherein said feeder includes a feeler rod located above said conveyor and extending transversely thereto, said rod operable to break up said bridged over feed in response to said trough movement.

4. The invention as in claim 3 wherein said interconnecting means includes a rod member, said rod member being interconnected with said conveyor and said trough, said trough movement being translated through said rod member to said auger and said feeler rod, the feeler rod movement thereby operable to break up said feed and said conveyor transporting same through said opening.

5. The invention as in claim 1 wherein said feeder includes a means for dispersing said feed evenly over the upper surface of said trough as said feed is being dispensed from said hopper.

6. The invention as in claim 5 wherein said dispersing means includes a grid structure swivelly affixed relative to the trough and located above the upper surface thereof, said grid structure and said trough being in an operable position below the water surface.

7. The invention as in claim 1 wherein said attracting means includes a means for protecting and retaining a portion of the feed on said trough from consumption by the fish.

8. The invention as in claim 7 wherein said trough is constructed of corrugated glass fiber having a plurality of peaks and valleys therein, and wherein said protecting means includes a sprial structure extending substantially the length of each valley.

9. The invention as in claim 1 wherein said dispensing means includes conveyor suspended at one end thereof above said opening, said interconnecting means interconnecting said trough and said conveyor, a feeler rod located above said conveyor, and extending transversely thereto, said feeler rod operable to break up said feed adjacent said opening in response to said trough being moved and said conveyor operable to transport said feed through said opening as a result of said movement, and a means for protecting and retaining a portion of the feed on said trough from consumption by the fish.

10. The invention as in claim 9 wherein said feeder includes a means for disbursing said feed over the upper surface of said trough as said feed is dispensed from said hopper, and wherein said interconnecting means includes a rod structure interconnecting said dispersing means and said conveyor, said movement of said trough and said dispensing means being translated through said rod structure to said auger and said feeler rod, the feeler rod movement operable to break up said feed and said conveyor transporting same through said opening.

11. The method of feeding fish in accordance with the feeding demands of said fish, said method comprising the steps of:
   locating a hopper containing feed above a feeding area,
   flexibly suspending a feed trough from said hopper,
   dispensing feed from said hopper onto said trough as a result of the fish contacting and moving said trough,
   stabilizing the position of said trough and said flexible suspending means after movement thereof, and
   attracting said fish to contact and move said trough when said fish demand feed, said contacting and moving of said trough thereby causing said feed to be dispensed from said hopper into said feeding area.

12. The invention as in claim 11 wherein said attracting step includes the step of presenting at least a portion of said feed on said trough but prohibiting its consumption.

References Cited

UNITED STATES PATENTS

| | | | |
|---|---|---|---|
| 1,620,686 | 3/1927 | Pauley | 119—70 |
| 2,761,422 | 9/1956 | Martin | 119—5 |
| 2,966,885 | 1/1961 | Bentley | 119—51 |

ALDRICH F. MEDBERY, Primary Examiner

U.S. Cl. X.R.

119—3, 5, 54, 53.5